(12) United States Patent
Wei et al.

(10) Patent No.: US 11,829,005 B2
(45) Date of Patent: Nov. 28, 2023

(54) WIDE-ANGLE LENS, IMAGING MODULE AND CAMERA INCLUDING EIGHT LENSES OF −−+−++−+ REFRACTIVE POWERS

(71) Applicant: JIANGXI LIANCHUANG ELECTRONIC CO., LTD., Nanchang (CN)

(72) Inventors: Wenzhe Wei, Nanchang (CN); Xuming Liu, Nanchang (CN); Jiyong Zeng, Nanchang (CN)

(73) Assignee: JIANGXI LIANCHUANG ELECTRONIC CO., LTD., Nanchang (CN)

( * ) Notice: Subject to any disclaimer, the term of this patent is extended or adjusted under 35 U.S.C. 154(b) by 749 days.

(21) Appl. No.: 16/925,366

(22) Filed: Jul. 10, 2020

(65) Prior Publication Data

US 2021/0055510 A1 Feb. 25, 2021

Related U.S. Application Data

(63) Continuation-in-part of application No. PCT/CN2020/083918, filed on Apr. 9, 2020.

(30) Foreign Application Priority Data

Aug. 20, 2019 (CN) .......................... 201910766876.X

(51) Int. Cl.
*G02B 9/64* (2006.01)
*G02B 13/06* (2006.01)
(52) U.S. Cl.
CPC .............. *G02B 9/64* (2013.01); *G02B 13/06* (2013.01)

(58) Field of Classification Search
CPC .................................. G02B 9/64; G02B 13/06
See application file for complete search history.

(56) References Cited

U.S. PATENT DOCUMENTS

2011/0242682 A1   10/2011   Chikara

FOREIGN PATENT DOCUMENTS

| CN | 104871063 A | 8/2015 |
| CN | 107132643 A | 9/2017 |
| CN | 107167898 A | 9/2017 |

(Continued)

OTHER PUBLICATIONS

International Search Report issued in corresponding International application No. PCT/CN2020/083918, dated Jul. 2, 2020.

(Continued)

*Primary Examiner* — Wen Huang

(57) ABSTRACT

The disclosure provides a wide-angle lens, an imaging module, and a camera. From an object side to an imaging plane, the wide-angle lens sequentially includes: a first lens and a second lens each having a negative refractive power, a convex object side surface, and a concave image side surface; a third lens having a positive refractive power and a convex image side surface; a fourth lens having a negative refractive power, a concave object side surface, and a convex image side surface; a stop; a fifth lens; a sixth lens; a seventh lens having a negative refractive power, a concave object side surface, and a concave image side surface; an eighth lens; and an optical filter. The fifth lens, the sixth lens, and the eighth lens each have a positive refractive power, a convex object side surface, and a convex image side surface.

20 Claims, 6 Drawing Sheets

(56) References Cited

FOREIGN PATENT DOCUMENTS

| | | |
|---|---|---|
| CN | 207114859 U | 3/2018 |
| CN | 108241202 A | 7/2018 |
| CN | 108319004 A | 7/2018 |
| CN | 109143534 A | 1/2019 |
| CN | 208766381 U | 4/2019 |
| CN | 110007447 A | 7/2019 |
| CN | 110596860 A | 12/2019 |
| JP | H08320435 A | 12/1996 |
| JP | 2018081240 | 5/2018 |
| WO | 2010077050 A2 | 7/2010 |

OTHER PUBLICATIONS

Written opinion of the International Search Authority issued in corresponding International application No. PCT/CN2020/083918, dated Jul. 2, 2020.

SIPO, First Office Action issued for CN Application No. 201910766876.X, dated Mar. 30, 2021.

SIPO, Second Office Action issued for CN Application No. 201910766876.X, dated Jun. 3, 2021.

WIDE-ANGLE LENS, IMAGING MODULE AND CAMERA INCLUDING EIGHT LENSES OF −−+−++−+ REFRACTIVE POWERS

CROSS REFERENCE TO RELATED APPLICATION

This application is a continuation-in-part of International Application No. PCT/CN2020/083918, filed on Apr. 9, 2020, titled "HIGH-RESOLUTION WIDE-ANGLE LENS AND IMAGING DEVICE". The International Application claims priority to a Chinese application No. 201910766876.X, filed on Aug. 20, 2019, titled "HIGH-RESOLUTION WIDE-ANGLE LENS AND IMAGING DEVICE", the entirety of which is incorporated by reference herein.

TECHNICAL FIELD

The present disclosure relates to a lens imaging system, in particular to a wide-angle lens, an imaging device, an imaging module, and a camera.

BACKGROUND

With the continuous progress of science and technology, wide-angle lenses are making a rapid development and are widely used in various industries, especially in the vehicle-mounted field. With the widespread use of vehicle-mounted lenses, people pay more and more attention to their performance issues, such as the pros and cons of the imaging effect, the size of field of view (FOV), and the like. Optical lenses currently applied to vehicle-mounted systems generally have a large FOV and a relatively large chromatic aberration at a margin field, which affects the resolution of the optical lens at the margin field and makes the optical lens is hard to achieve a larger imaging range. The disclosure is provided based on the above background.

SUMMARY

The disclosure provides a wide-angle lens, an imaging device, an imaging module, and a camera, which is capable of correcting the chromatic aberration at the margin field, improving the resolution at the margin field, and achieving a large imaging range.

The embodiments of the present disclosure provide the following technical solutions.

In a first aspect, the present disclosure provides a wide-angle lens. From an object side to an imaging plane, the lens sequentially includes: a first lens, a second lens, a third lens, a fourth lens, a stop, a fifth lens, a sixth lens, a seventh lens, an eighth lens, and an optical filter. The first lens has a negative refractive power, a convex object side surface, and a concave image side surface. The second lens has a negative refractive power, a convex object side surface, and a concave image side surface. The third lens has a positive refractive power and a convex image side surface. The fourth lens has a negative refractive power, a concave object side surface, and a convex image side surface. The fifth lens has a positive refractive power, a convex object side surface, and a convex image side surface. The sixth lens has a positive refractive power, a convex object side surface, and a convex image side surface. The seventh lens has a negative refractive power, a concave object side surface, and a concave image side surface. The eighth lens has a positive refractive power, a convex object side surface, and a convex image side surface. The optical filter is disposed between the eighth lens and the imaging plane.

In a second aspect, the present disclosure further provides an imaging device, including the wide-angle lens provided in the first aspect and an imaging element, the imaging element is configured to convert optical images formed by the wide-angle lens into electrical signals.

In a third aspect, the present disclosure provides an imaging module, including a wide-angle lens and an imaging element coupled to the wide-angle lens, wherein the wide-angle lens is configured to form optical images, the imaging element is configured to convert the optical images into electrical signals; the wide-angle lens sequentially comprises a first lens, a second lens, a third lens, a fourth lens, a stop, a fifth lens, a sixth lens, a seventh lens, an eighth lens, and an optical filter, from an object side to an imaging plane; wherein the first lens and the second lens each have a negative refractive power, a convex object side surface, and a concave image side surface; the fifth lens, the sixth lens, and the eighth lens each have a positive refractive power, a convex object side surface and a convex image side surface; wherein the third lens and the fourth lens are cemented to form a first doublet, the first doublet has a convex image side surface, the sixth lens and the seventh lens are cemented to form a second doublet, the second doublet has a concave image side surface.

In a fourth aspect, the present disclosure provides a camera, including an imaging module, a processor, and a memory, wherein the imaging module includes a wide-angle lens and an image sensor coupled to the wide-angle lens, the imaging module is configured to capture images, the processor is configured to process the captured images, and the memory is configured to store the captured images; wherein the wide-angle lens sequentially includes: a first lens having a negative refractive power, a convex refractive surface, and a concave image side surface; a second lens having a negative refractive power, a convex refractive surface, and a concave image side surface; a third lens having a positive refractive power and a convex image side surface; a fourth lens having a negative refractive power, a concave object side surface, and a convex image side surface; a stop; a fifth lens having a positive refractive power, a convex object side surface and a convex image side surface; a sixth lens having a positive refractive power, a convex object side surface and a convex image side surface; a seventh lens having a negative refractive power, a concave object side surface and a concave image side surface; an eighth lens having a positive refractive power, a convex object side surface and a convex image side surface; and an optical filter disposed between the eighth lens and the image sensor; wherein the field of view of the wide-angle lens is greater than or equal to 150°, and the total optical length of the wide-angle lens is smaller than or equal to 18 mm.

Compared with the prior art, in the wide-angle lens, the imaging device, the imaging module, and the camera provided by the present disclosure, the first lens and the second lens are configured to decrease the incident angle of incident rays and correct the distortion, which are conductive to reduce the volume of the wide-angle lens and facilitate subsequent correction to the aberration thereof by the imaging system, thus improving the resolution at the margin field. The second lens is configured to correct the distortion. The fifth lens is configured to collect rays. The eighth lens plays a role of eliminating the aberration and controlling the exit angle of the main rays. The sensitivity of the lenses can be effectively reduced by using the third lens and the fourth lens in front of the stop.

MAIN REFERENCE NUMERALS

Figure 1:
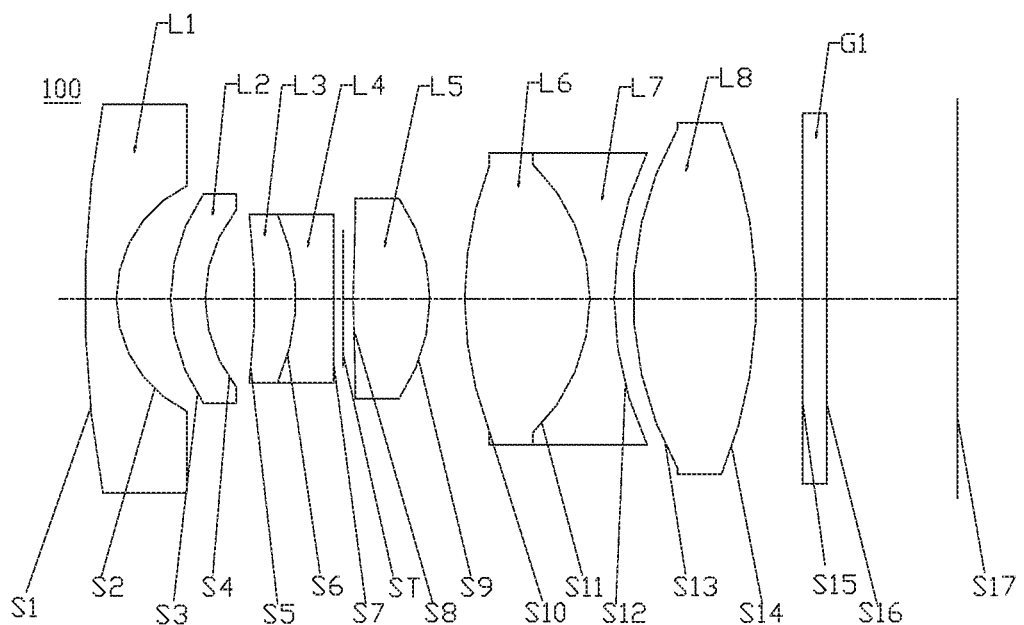
FIG. 1 is a schematic structural diagram of a wide-angle lens according to a first embodiment of the present disclosure.
Figure 2:
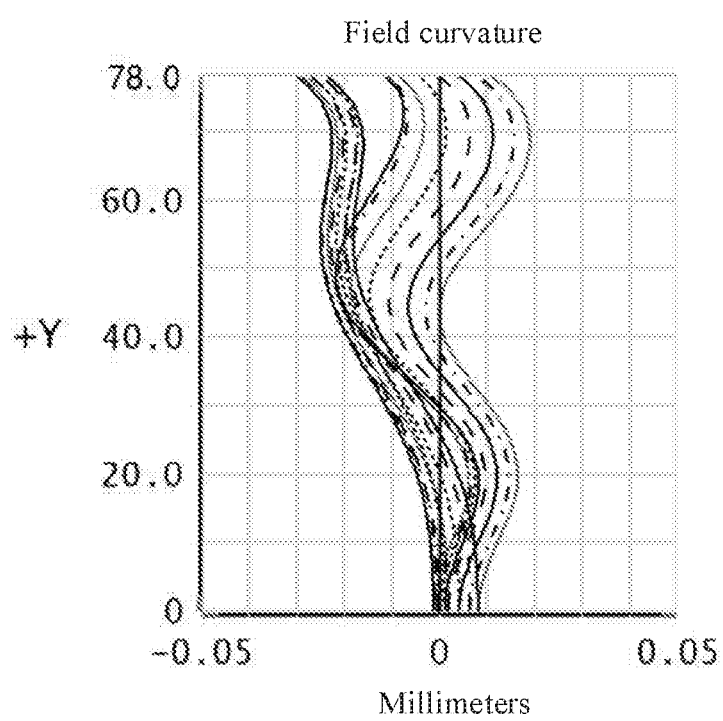
FIG. 2 is a field curvature diagram of the wide-angle lens according to the first embodiment of the present disclosure.
Figure 3:
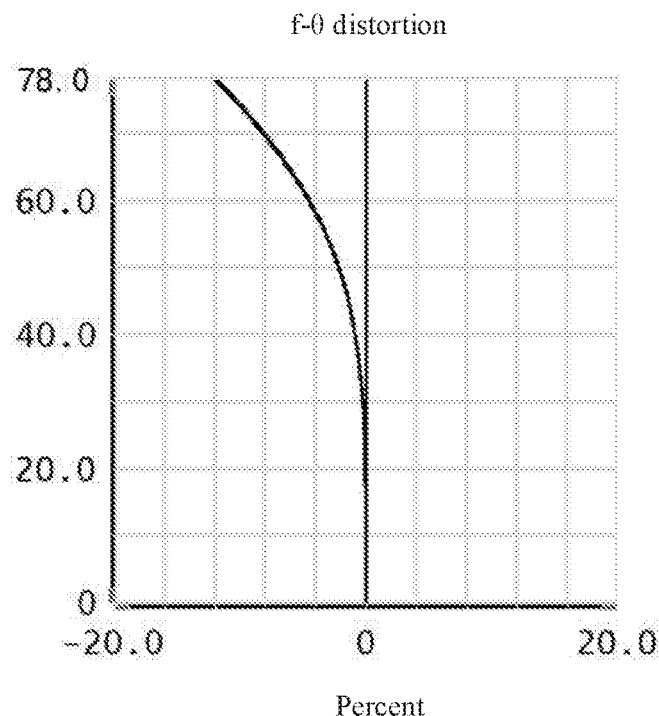
FIG. 3 is a distortion diagram of the wide-angle lens according to the first embodiment of the present disclosure.
Figure 4:
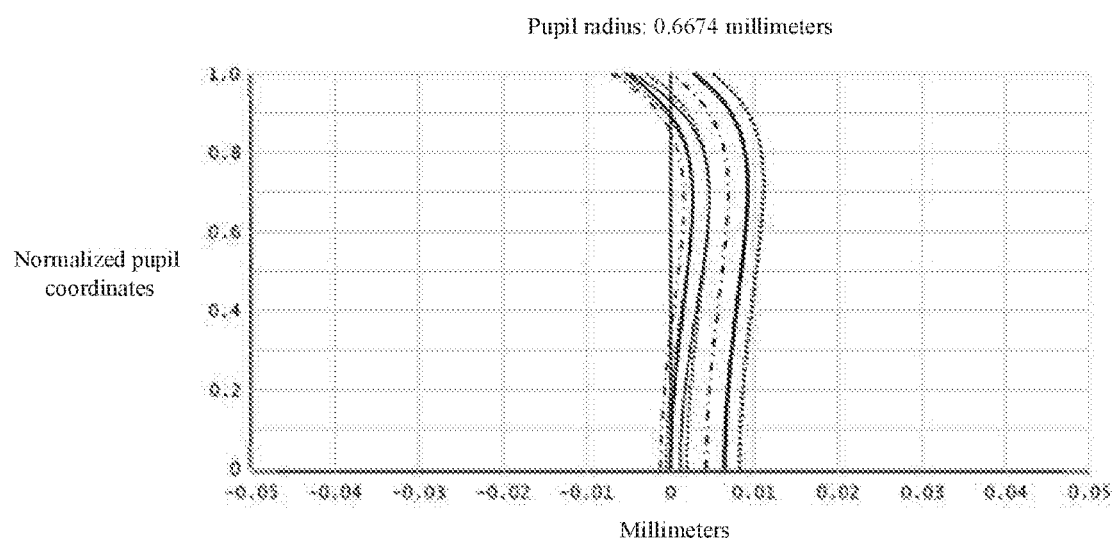
FIG. 4 is an axial chromatic aberration diagram of the wide-angle lens according to the first embodiment of the present disclosure.
Figure 5:
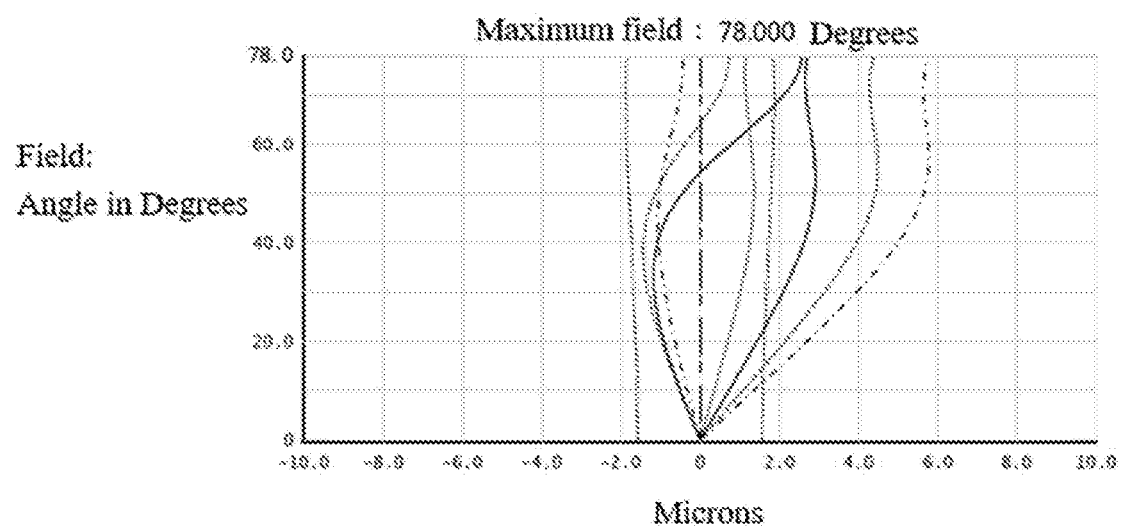
FIG. 5 is a lateral chromatic aberration diagram of the wide-angle lens according to the first embodiment of the present disclosure.

| | | | |
|---|---|---|---|
| first lens | L1 | second lens | L2 |
| third lens | L3 | fourth lens | L4 |
| fifth lens | L5 | sixth lens | L6 |
| seventh lens | L7 | eighth lens | L8 |
| stop | ST | optical filter | G1 |
| object side surface of the first lens | S1 | image side surface of the first lens | S2 |
| object side surface of the second lens | S3 | image side surface of the second lens | S4 |
| object side surface of the third lens | S5 | image side surface of the third lens | S6-1 |
| object side surface of the fourth lens | S6-2 | image side surface of the fourth lens | S7 |
| cemented surface of the third lens and the fourth lens | S6 | object side surface of the fifth lens | S8 |
| image side surface of the fifth lens | S9 | object side surface of the sixth lens | S10 |
| image side surface of the sixth lens | S11-1 | object side surface of the seventh lens | S11-2 |
| image side surface of the seventh lens | S12 | cemented surface of the sixth lens and the seventh lens | S11 |
| object side surface of the eighth lens | S13 | image side surface of the eighth lens | S14 |
| object side surface of the optical filter | S15 | image side surface of the optical filter | S16 |
| imaging plane | S17 | imaging element | 310, 420 |
| wide-angle lens | 100, 200, 410 | | |
| imaging device | 300 | | |
| imaging module | 400 | camera | 500 |
| processor | 510 | memory | 520 |

The present disclosure will be further illustrated by the following specific embodiments in combination with the above accompanying drawings.

DETAILED DESCRIPTION OF PREFERRED EMBODIMENTS

In order to facilitate the understanding of the present disclosure, the present disclosure will be described more comprehensively below with reference to the related accompanying drawings. Several embodiments of the present disclosure are given in the accompanying drawings. However, the present disclosure can be implemented in various forms, and is not limited to the embodiments described herein. Rather, these embodiments are provided to make the disclosure more thorough and comprehensive.

Unless defined otherwise, all technical terms and scientific terms used herein have the same meaning as commonly understood by one of ordinary skill in the art to which this disclosure belongs. The terminology used herein in the description of the disclosure are only for the purpose of describing specific embodiments, and is not intended to limit the disclosure. The term "and/or" as used herein includes any and all combinations of one or more of the associated listed items.

A wide-angle lens provided by embodiments of the present disclosure includes a first lens, a second lens, a third lens, a fourth lens, a stop, a fifth lens, a sixth lens, a seventh lens, an eighth lens and an optical filter, in an order from an object side to an imaging plane. The first lens has a negative refractive power, a convex object side surface, and a concave image side surface. The second lens has a negative refractive power, a convex object side surface, and a concave image side surface. The third lens has a positive refractive power and a convex image side surface. The fourth lens has a negative refractive power, a concave object side surface, and a convex image side surface. The fifth lens has a positive refractive power, a convex object side surface, and a convex image side surface. The sixth lens has a positive refractive power, a convex object side surface, and a convex image side surface. The seventh lens has a negative refractive power, a concave object side surface, and a concave image side surface. The eighth lens has a positive refractive power, a convex object side surface, and a convex image side surface. The optical filter is disposed between the eighth lens and the imaging plane.

Further, in some embodiments, the third lens and the fourth lens form a first cemented body, the sixth lens and the seventh lens form a second cemented body. The wide-angle lens of the present disclosure adopts two cemented bodies, which may effectively correct the chromatic aberration and ensure a high-quality resolution. The first cemented body is arranged in front of the stop, which may effectively decrease the sensitivity of the lenses, facilitate the assembly, and reduce a length of the wide-angle lens.

In some embodiments, the first lens, the second lens, the third lens, the fourth lens, the fifth lens, the sixth lens, the seventh lens, and the eighth lens each are glass lenses. Due to the adoption of the eight glass lenses, the wide-angle lens has good thermostability and mechanical strength, which is beneficial to work in high temperature, high pressure, cold and other extreme environments.

In some embodiments, at least two of the first lens, the second lens, the third lens, the fourth lens, the fifth lens, the sixth lens, the seventh lens and the eighth lens are aspherical lenses. Due to the adoption of the aspherical lenses, the chromatic aberration of the optical system can be corrected better, and imaging qualities are greatly improved. When the second lens is a glass aspherical lens, the capability of the second lens to correct the distortion can be improved.

In some embodiments, the second lens and the eighth lens are both glass aspherical lenses, which may effectively eliminate the influences of spherical aberration on performances of the lens, and effectively control the exit angle of the main rays.

In some embodiments, the first lens, the third lens, the fourth lens, the sixth lens, and the seventh lens each may be glass spherical lenses. The fifth lens may be a glass spherical lens or a glass aspherical lens.

In some embodiments, the first lens and the second lens are both meniscus lenses.

In some embodiments, the field of view of the wide-angle lens is greater than or equal to 150°, the total optical length of the wide-angle lens is smaller than or equal to 18 mm.

In some embodiments, the wide-angle lens provided by the embodiments of the present disclosure satisfies the following conditional expression:

$$0<f_6/d<10; \qquad (1)$$

where $f_6$ represents a focal length of the image side surface of the third lens, d represents a distance between a vertex of the image side surface of the second lens and a vertex of the image side surface of the third lens.

Satisfying the conditional expression (1), rays from the image side surface of the third lens may be effectively prevented from being reflected and converged on the image side surface of the second lens, thereby avoiding ghosting occurred by being reflected to the imaging plane and preventing the ghosting from affecting imaging qualities.

In some embodiments, the wide-angle lens provided by the embodiments of the present disclosure satisfies the following conditional expression:

$$0<(\varphi_8+\varphi_9)/\varphi_{L5}<2; \qquad (2)$$

where $\varphi_8$ represents a refractive power of the object side surface of the fifth lens, $\varphi_9$ represents a refractive power of the image side surface of the fifth lens, $\varphi_{L5}$ represents a refractive power of the fifth lens.

Satisfying the conditional expression (2) may improve the capability of controlling the fifth lens to collect rays, reduce the angle between the rays and an optical axis, and avoid a large aberration generated on a surface of a next lens by the rays.

In the following embodiments, the wide-angle lens provided by the embodiments of the present disclosure satisfies the following condition expression:

$$0<f_2/f_{L1}+f_4/f_{L2}<2; \qquad (3)$$

where $f_2$ represents a focal length of the image side surface of the first lens, $f_4$ represents a focal length of the image side surface of the second lens, $f_{L1}$ represents a focal length of the first lens, $f_{L2}$ represents a focal length of the second lens.

Satisfying the conditional expression (3) may effectively increase the FOV, ensure that the FOV of the wide-angle lens is not less than 150°, effectively reduce the angle between the rays and the optical axis, reduce the work of correcting the aberration of the next lens, and reduce the aperture of the next lens.

In the following embodiments, the wide-angle lens provided by the embodiments of the present disclosure satisfies the following conditional expressions:

$$0<(f_5/f_{L3}+f_7/f_{L4})/f_{34}<1; \qquad (4)$$

where $f_5$ represents a focal length of the object side surface of the third lens, $f_7$ represents a focal length of the image side surface of the fourth lens, $f_{L3}$ represents a focal length of the third lens, $f_{L4}$ represents a focal length of the fourth lens, $f_{L34}$ represents a focal length of the first cemented body formed by the third lens and the fourth lens.

Due to lenses before and after the stop have high tolerance sensitivities, satisfying the conditional expression (4) may effectively control the curvature radius of the image side surface and the object side surface of the first cemented body in front of the stop, avoid the surfaces of the lenses from overbending, ensure that the rays do not have a relatively large refraction angle after passing through the first cemented body, thereby reducing the tolerance sensitivities of the first cemented body in front of the stop, and effectively improving the assembly yield.

In the following embodiments, the wide-angle lens provided by the embodiments of the present disclosure satisfies the following expressions:

$$D_1>D_2>D_{34}; \qquad (5)$$

$$D_8>D_{67}>D_5 \qquad (6)$$

where $D_1$ represents the maximum diameter of the first lens, $D_2$ represents the maximum diameter of the second lens, $D_{34}$ represents the maximum diameter of the first cemented body, $D_5$ represents the maximum diameter of the fifth lens, $D_{67}$ represents the maximum diameter of the second cemented body. $D_8$ represents the maximum diameter of the eighth lens.

The present disclosure further provides an imaging device, which includes the wide-angle lens of any one of the above embodiments and an imaging element. The imaging element is configured to convert optical images formed by the wide-angle lens into electrical signals.

Satisfying the above configurations is beneficial to ensure that the wide-angle lens has the characteristics of large imaging plane, low dispersions, and high pixels. Using two cemented lenses may effectively correct the chromatic aberration at the margin field, improve the resolution of the margin field, and further enlarge the range of the FOV. The second lens is a glass aspherical lens, which may improve the capability of the second lens to correct the distortion, control the distortion in a very small range, facilitate to increase the magnification of the margin field, make the margin field to have more pixels, and improve the resolution of the margin field. The eighth lens is a glass aspherical lens, which may effectively correct the chromatic aberration such as spherical aberration, field curvature and the like, improve the resolution of the wide-angle lens, meanwhile the exit angle of the main rays can be better controlled.

The surface shape of the aspherical surface of the wide-angle lens in each embodiment of the present disclosure satisfies the following equation:

$$z = \frac{ch^2}{1+\sqrt{1+(1+K)c^2h^2}} + Bh^2 + Ch^6 + Dh^8 + Eh^{10} - Fh^{12}, \quad (7)$$

where z represents a distance from a point on a curved surface to a vertex of the curved surface in an optical axis direction, c represents a curvature of the vertex of the curved surface, K represents a quadratic curved surface coefficient, h represents a distance between a point of the curved surface and the optical axis, B, C, D, E, and F respectively represent a fourth, sixth, eighth, tenth, and twelfth order curved surface coefficients.

In the following embodiments, the thickness, the curvature radius, and the material of every lens in the wide-angle lens is different, specific differences can be referred to the parameters table of every embodiment.

First Embodiment

Please refer to FIG. 1, a wide-angle lens 100 provided by a first embodiment of the present disclosure includes a first lens L1, a second lens L2, a third lens L3, a fourth lens L4, a stop ST, a fifth lens L5, a sixth lens L6, a seventh lens L7, a eighth lens L8, and an optical filter G1, in an order from an object side to an imaging plane.

The first lens L1 has a negative refractive power, an object side surface S1 of the first lens L1 is convex, an image side surface S2 of the first lens L1 is concave, the first lens L1 is a glass spherical lens.

The second lens L2 has a negative refractive power, an object side surface S3 of the second lens L2 is convex, an image side surface S4 of the second lens L2 is concave, the second lens L2 is a glass aspherical lens.

The third lens L3 has a positive refractive power, an object side surface S5 of the third lens L3 is concave, an image side surface S6-1 of the third lens L3 is convex, the third lens L3 is a glass spherical lens.

The fourth lens L4 has a negative refractive power, an object side surface S6-2 of the fourth lens L4 is concave, and an image side surface S7 of the fourth lens L4 is convex. The fourth lens L4 is a glass spherical lens.

In this embodiment, the third lens L3 and the fourth lens L4, are cemented into a first cemented body, and the third lens L3 and the fourth lens L4 are both glass spherical lenses, that is, the image side surface S6-1 of the third lens L3 and the object side surface S6-2 of the fourth lens L4 are seamless cemented, thereby forming a cemented surface S6 of the first cemented body. Exemplarily, the first cemented body may be considered as a first doublet having a convex image side surface S7.

The fifth lens L5 has a negative refractive power, an object side surface S8 and an image side surface S9 of the fifth lens L5 are both convex surfaces, the fifth lens L5 is a glass spherical lens. In the other embodiments of the disclosure, the fifth lens L5 also may be a glass aspherical lens.

The sixth lens L6 has a positive refractive power, an object side surface S10 and an image side surface S11-1 of the sixth lens L6 are both convex surfaces.

The seventh lens L7 has a negative refractive power, an object side surface S11-2 and an image side surface S12 of the seventh lens L7 are both concave surfaces.

In this embodiment, the sixth lens L6 and the seventh lens L7 are cemented into a second cemented body, and the sixth lens L6 and the seventh lens L7 are both glass spherical lenses, that is, the image side surface S11-1 of the sixth lens L6 and the object side surface S11-2 of the seventh lens L7 are seamless cemented, thereby forming a cemented surface S11 of the second cemented body. Exemplarily, the second cemented body may be considered as a second doublet having a concave image side surface S12.

The eighth lens L8 has a positive refractive power, an object side surface S14 and an image side surface S14 of the eighth lens L8 are both convex surfaces, the eighth lens L8 is a glass aspherical lens.

The stop ST is disposed between the fourth lens L4 and the fifth lens L5, the optical filter G1 is disposed between the eighth lens L8 and the imaging plane S17.

Related parameters of every lens of the wide-angle lens 100 provided in the first embodiment of the disclosure are shown in Table 1.

TABLE 1

| Surface No. | Surface type | Curvature radius (mm) | Thickness (mm) | Refractivity | Abbe number |
|---|---|---|---|---|---|
|  | Object side surface | Infinity | Infinity |  |  |
| S1 | Spherical surface | 20.618478 | 0.646574 | 1.723 | 38.02 |
| S2 | Spherical surface | 2.474373 | 1.117767 |  |  |
| S3 | Aspherical surface | 3.838380 | 0.713696 | 1.851 | 40.10 |
| S4 | Aspherical surface | 3.246206 | 1.020384 |  |  |
| S5 | Spherical surface | −12.764631 | 0.843211 | 1.847 | 23.79 |
| S6 | Spherical surface | −3.941224 | 0.799983 | 1.575 | 41.51 |
| S7 | Spherical surface | −73.395341 | 0.186168 |  |  |
| ST | Stop | infinite | 0.199999 |  |  |
| S8 | Spherical surface | 27.968344 | 1.582101 | 1.554 | 71.72 |
| S9 | Spherical surface | −3.486700 | 0.720807 |  |  |
| S10 | Spherical surface | 7.207495 | 2.581421 | 1.593 | 68.53 |
| S11 | Spherical surface | −3.650213 | 0.499990 | 1.699 | 30.05 |
| S12 | Spherical surface | 6.616392 | 0.392822 |  |  |
| S13 | Aspherical surface | 6.373027 | 2.536153 | 1.497 | 81.52 |
| S14 | Aspherical surface | −6.263223 | 0.953293 |  |  |
| S15 | Spherical surface | Infinity | 0.500000 | 1.517 | 64.21 |
| S16 | Spherical surface | Infinity | 2.705633 |  |  |
| S17 | Imaging plane | Infinity | — |  |  |

Parameters of aspherical surfaces of every lens of this embodiment are shown in Table 2.

TABLE 2

| Surface No. | K | B | C | D | E | F |
|---|---|---|---|---|---|---|
| S3 | 0.577732 | 5.559529E-03 | 2.277054E-04 | -9.961921E-05 | -3.688140E-05 | -1.573463E-06 |
| S4 | 0.583077 | 1.149661E-02 | 6.665132E-04 | 3.674059E-04 | -4.253678E-04 | 4.301592E-05 |
| S13 | 3.407026 | -4.507028E-04 | 1.060332E-06 | -1.842814E-06 | 2.807170E-07 | 1.514982E-09 |
| S14 | 3.515491 | 2.985915E-03 | -2.168070E-05 | 7.768733E-06 | -1.198637E-06 | 7.019014E-08 |

In this embodiment the field curvature, the distortion, and the axial chromatic aberration and the lateral chromatic aberration of the wide-angle lens 100 are respectively shown in FIG. 2, FIG. 3, FIG. 4 and FIG. 5. As can be seen from FIG. 2 to FIG. 5, the field curvature, the distortion, and the chromatic aberration in this embodiment can all be well corrected.

Second Embodiment

Figure 6:
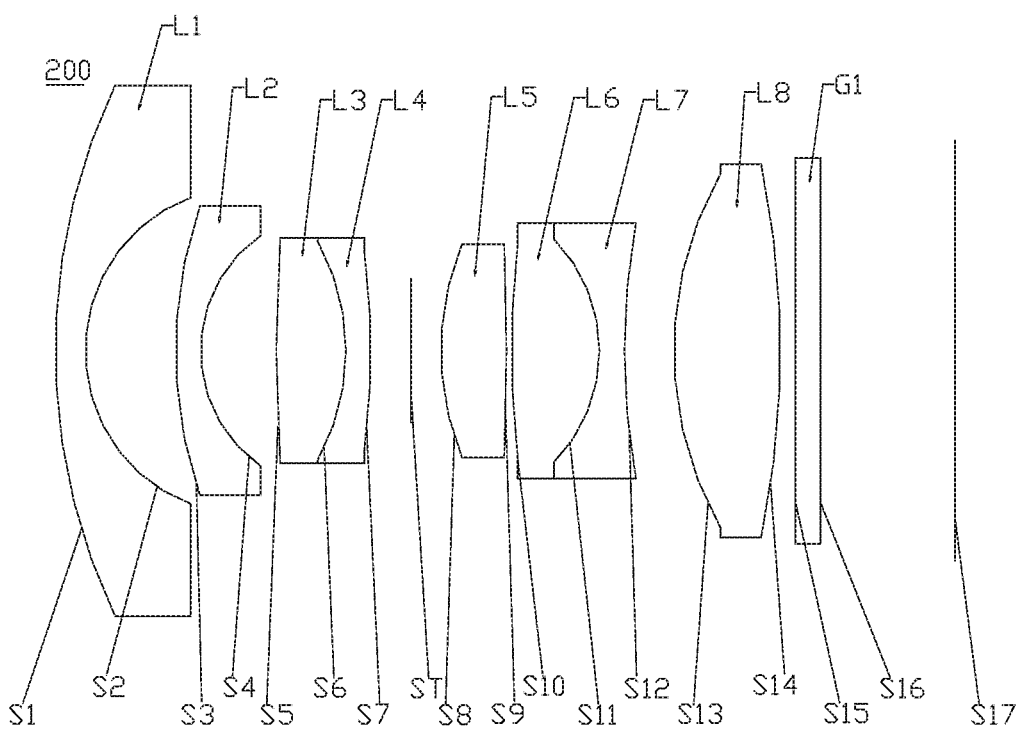
FIG. 6 is a schematic structural diagram of a wide-angle lens according to a second embodiment of the present disclosure.

Please refer to FIG. 6, which is a schematic structural diagram of a wide-angle lens 200 provided by this embodiment. The wide-angle lens 200 in this embodiment is substantially similar to the wide-angle lens 100 in the first embodiment except that: the object side surface S5 of the third lens L3 of the wide-angle lens 200 in this embodiment is convex, and the fifth lens L5 is a glass aspherical lens, and the curvature radius and the materials of each lens are different.

Related parameters of each lens of the wide-angle lens 200 provided in the first lens of the disclosure are shown in Table 3.

TABLE 3

| Surface No. | Surface type | Curvature radius (mm) | Thickness (mm) | Refractivity | Abbe number |
|---|---|---|---|---|---|
| | Object side surface | Infinity | Infinity | | |
| S1 | Spherical surface | 11.698062 | 0.600000 | 1.713 | 53.87 |
| S2 | Spherical surface | 3.149247 | 1.805832 | | |
| S3 | Aspherical surface | 4.729328 | 0.500000 | 1.808 | 40.92 |
| S4 | Aspherical surface | 2.123460 | 1.511239 | | |
| S5 | Spherical surface | 29.456200 | 1.395030 | 1.911 | 35.26 |
| S6 | Spherical surface | -4.267443 | 0.500000 | 1.607 | 56.66 |
| S7 | Spherical surface | -14.060062 | 0.800000 | | |
| ST | Stop | Infinity | 0.600000 | | |
| S8 | Aspherical surface | 9.095274 | 1.311782 | 1.774 | 49.60 |
| S9 | Spherical surface | -8.748841 | 0.100000 | | |
| S10 | Spherical surface | 17.619924 | 1.758061 | 1.593 | 68.53 |
| S11 | Spherical surface | -3.033210 | 0.500000 | 1.785 | 25.72 |
| S12 | Spherical surface | 13.527142 | 0.989673 | | |
| S13 | Spherical surface | 4.848865 | 2.128383 | 1.497 | 81.52 |
| S14 | Aspherical surface | -13.188461 | 0.300000 | | |
| S15 | Aspherical surface | Infinity | 0.500000 | 1.517 | 64.20 |
| S16 | Spherical surface | Infinity | 2.699818 | | |
| S17 | Imaging plane | Infinity | — | | |

Parameters of aspherical surfaces of each lens of this embodiment are shown in Table 4.

TABLE 4

| Surface No. | K | B | C | D | E | F |
|---|---|---|---|---|---|---|
| S3 | -1.461678 | -1.973816E-03 | -1.092328E-03 | 1.300557E-04 | -5.286833E-06 | 2.903912E-20 |
| S4 | -0.768780 | 3.904268E-03 | -2.233602E-03 | 2.748518E-04 | -1.757353E-05 | 3.147059E-22 |
| S8 | 6.197226 | 4.309783E-03 | 7.059398E-04 | 1.057363E-04 | -8.207393E-06 | -3.815630E-22 |
| S9 | -47.876973 | -5.137853E-03 | 3.275222E-03 | -4.620961E-04 | 9.393574E-05 | -1.182229E-21 |
| S13 | -0.736310 | -2.797389E-03 | 1.474756E-04 | -7.219679E-06 | -1.748435E-07 | 5.586896E-20 |
| S14 | 1.668835 | 2.458659E-03 | -6.260831E-05 | -1.485496E-06 | -2.451171E-07 | 2.566115E-20 |

Figure 7:
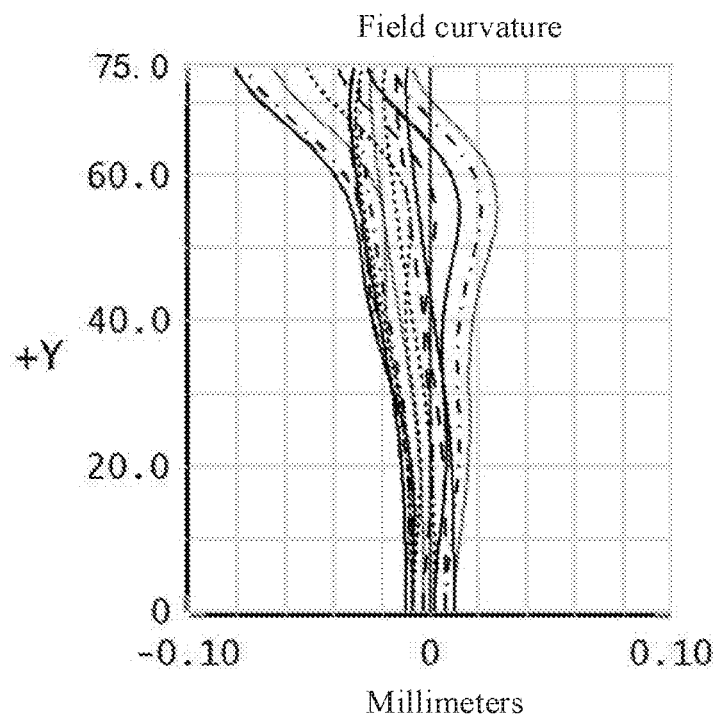
FIG. 7 is a field curvature diagram of the wide-angle lens according to the second embodiment of the present disclosure.
Figure 8:
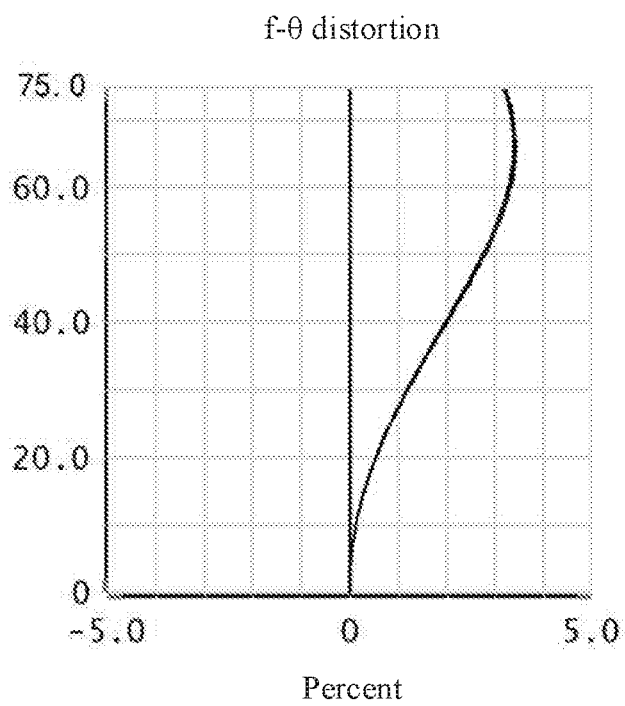
FIG. 8 is a distortion diagram of the wide-angle lens according to the second embodiment of the present disclosure.
Figure 9:
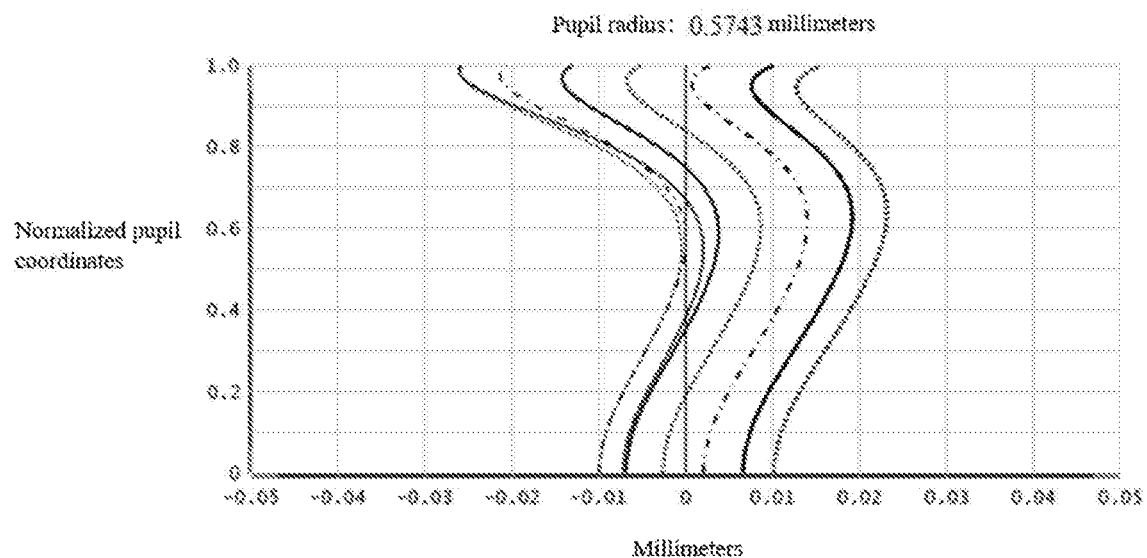
FIG. 9 is an axial chromatic aberration diagram of the wide-angle lens according to the second embodiment of the present disclosure.
Figure 10:
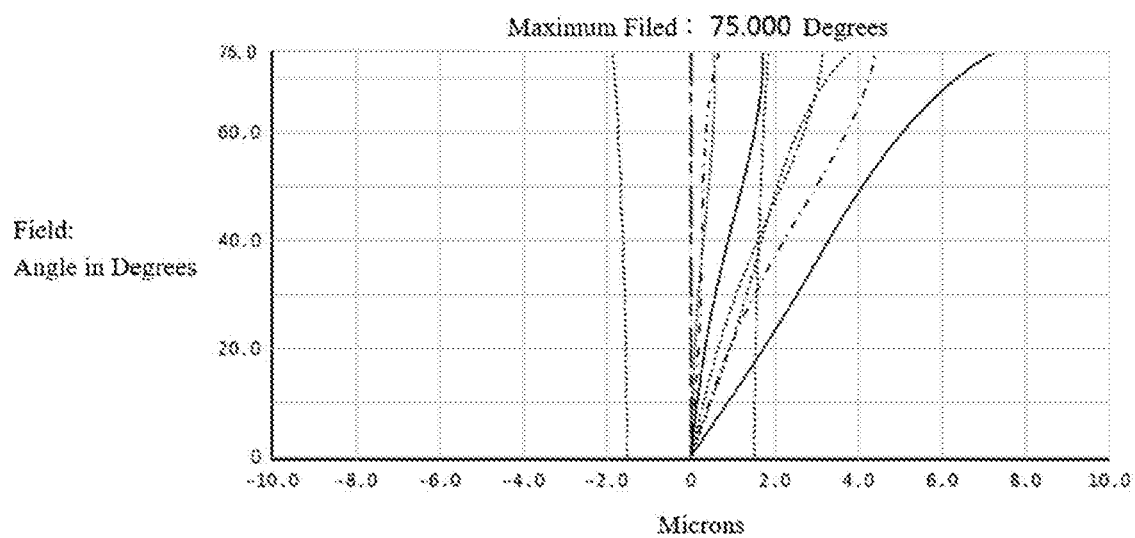
FIG. 10 is a lateral chromatic aberration diagram of the wide-angle lens according to the second embodiment of the present disclosure.

In this embodiment, the field curvature, the distortion, the axial chromatic aberration, and the lateral chromatic aberration of the wide-angle lens 200 are respectively shown in FIG. 7. FIG. 8. FIG. 9, and FIG. 10. As can be seen from FIG. 7 to FIG. 10, the field curvature, the distortion, and the chromatic aberration in this embodiment can all be well corrected.

Table 5 shows the above two embodiments and their corresponding optical characteristics, including the focal length f of the system, the aperture number F#, the field of view 2θ, the total optical length TTL, and the values corresponding to each of the above conditional expressions.

TABLE 5

| expression | Embodiment 1 | Embodiment 2 |
|---|---|---|
| f (mm) | 3.310 | 2.757 |
| F# | 2.475 | 2.400 |
| 2θ(deg) | 156.0 | 150.0 |
| TTL (mm) | 18.0 | 18.0 |
| $f_6/d$ | 7.541 | 4.744 |
| $(\varphi_8 + \varphi_9)/\varphi_{L5}$ | 1.041 | 1.002 |
| $f_2/f_{L1} + f_4/f_{L2}$ | 0.935 | 1.213 |
| $(f_5/f_{L3} + f_7/f_{L4})/f_{L34}$ | 0.013 | 0.174 |

Based on the above embodiments, the following optical indexes have been achieved: (1) the field of view: 2θ≥150°; (2) the total optical length: TTL≤18.0 mm; (3) the applicable spectral range is: 400 nm-700 nm.

In summary, in the wide-angle lens provided by the present disclosure, the first lens L1 and the second lens L2 are meniscus lenses, configured to reduce the incident angle of incident rays and to correct the distortion, and beneficial to reduce the volume of the wide-angle lens and facilitate a subsequent correction to the aberration thereof by the imaging system. The second lens L2 is a glass aspherical lens, which improves the capability of the second lens L2 to correct the distortion. The fifth lens L5 is configured to collect rays. The eighth lens L8 plays a role of eliminating the aberration and controlling the exit angle of the main rays. The third lens L3 and the fourth lens L4 form the first cemented body, the sixth lens L6 and the seventh lens L7 form the second cemented body, the adoption of two cemented bodies can effectively correct the chromatic aberration, wherein the first cemented body is disposed in front of the stop, which can effectively reduce the sensitivity of the lenses. Since every lens is a glass lens, the wide-angle lens has better stability and mechanical strength, which is beneficial to work in extreme environments.

Third Embodiment

Figure 11:
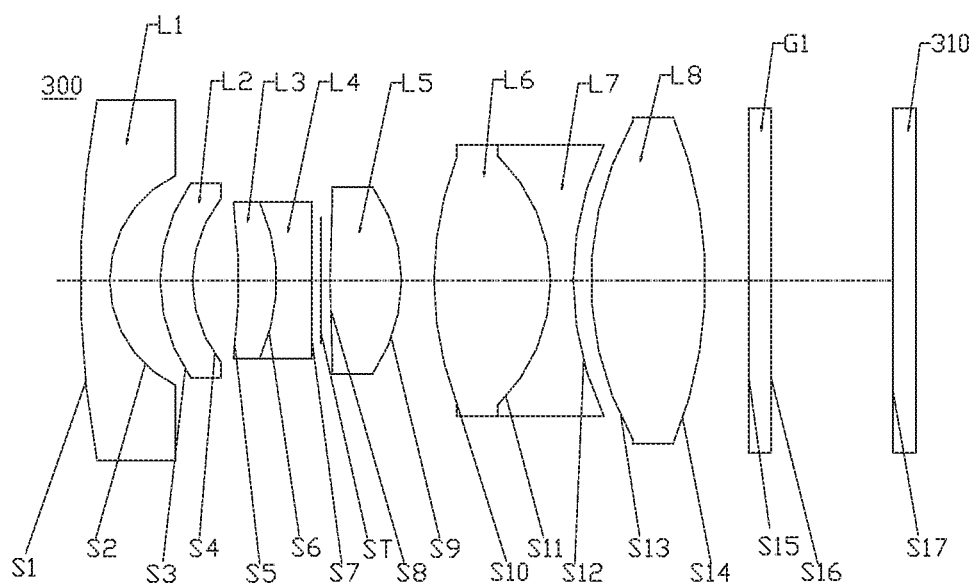
FIG. 11 is a schematic structural diagram of an imaging device according to a third embodiment of the present disclosure.

Please refer to FIG. 11, which is a schematic structural diagram of an imaging device 300 provided by this embodiment. The imaging device includes the optical imaging lens (for example, the wide-angle lens 100) in any of the above embodiments and an imaging element 310. The imaging element 310 may be a Complementary Metal Oxide Semiconductor (CMOS) image sensor or a Charge Coupled Device (CCD) image sensor.

The imaging device 300 may be a motion camera, a surveillance camera, a vehicle recorder, a video camera, and any other form of electric devices equipped with optical imaging devices.

The imaging device 300 provided by this embodiment includes a wide-angle lens, since the wide-angle lens can correct the chromatic aberration at the margin field, improve the resolution at the margin field, and achieve a larger imaging range, the imaging device 200 has advantages, such as a larger imaging range, a capability to correct the chromatic aberration at the margin field, improvements to the resolution at the margin field, and the like.

Fourth Embodiment

Figure 12:
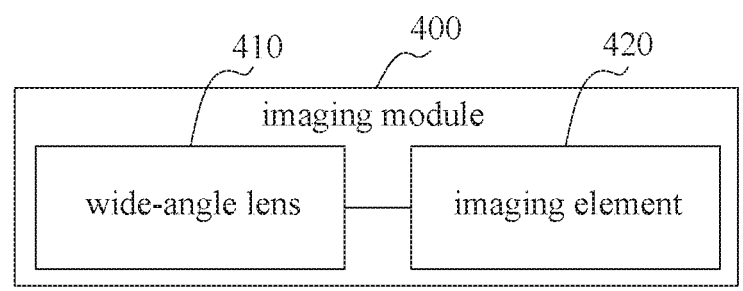
FIG. 12 is a schematic block diagram of an imaging module according to a fourth embodiment of the present disclosure.

FIG. 12 illustrates an imaging module 400, which includes a wide-angle lens 410 and an imaging element 420 coupled to the wide-angle lens 410. The wide-angle lens 410 may be the wide-angle lens of any embodiment as described above, such as the wide-angle lens 100 of the first embodiment or the wide-angle lens 200 of the second embodiment. The wide-angle lens 410 is configured to form optical images. The imaging element 420, such as a CMOS image sensor and a CCD image sensor, is configured to convert the optical images into electrical signals.

Fifth Embodiment

Figure 13:
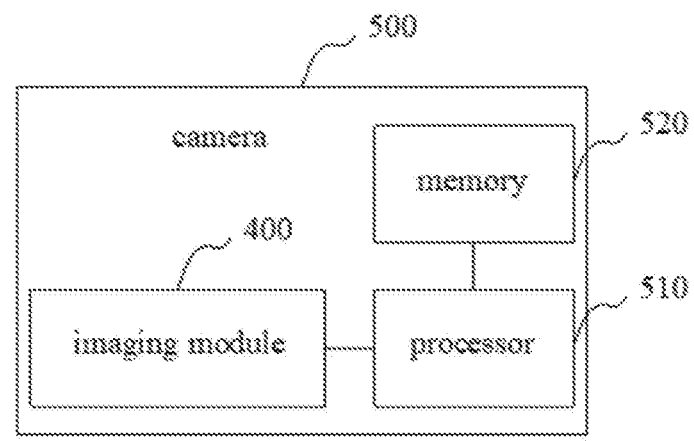
FIG. 13 is a schematic block diagram of a camera according to a fifth embodiment of the present disclosure.

Please refer to FIG. 13, which exemplarily shows a camera 500. The camera 500 includes the imaging module 400 as described in the above embodiment, a processor 510, and a memory 520. The imaging module 400 may be configured to capture optical images, the processor 510 may be configured to process the captured images, and the memory 520 may be configured to store the captured images.

The camera 500 may be a motion camera, a vehicle camera and the like. The application of the camera 500 is not limited in the disclosure.

The above embodiments merely illustrative of several embodiments of the present disclosure, and the description there of is more specific and detailed, however is not to be construed as limiting the scope of the disclosure. It should be noted that various variations and modifications may be made by those skilled in the art without departing from the spirit and scope of the disclosure, which fall within the scope of protection of the present disclosure. Therefore, the scope of the disclosure should be determined by the appended claims.

What is claimed is:

1. A wide-angle lens, from an object side to an imaging plane, sequentially comprising:
    a first lens with a negative refractive power, the first lens having a convex object side surface and a concave image side surface;
    a second lens with a negative refractive power, the second lens having a convex object side surface and a concave image side surface;
    a third lens with a positive refractive power, the third lens having a convex image side surface;
    a fourth lens with a negative refractive power, the fourth lens having a concave object side surface and a convex image side surface;
    a stop;
    a fifth lens with a positive refractive power, the fifth lens having a convex object side surface and a convex image side surface;
    a sixth lens with a positive refractive power, the sixth lens having a convex object side surface and a convex image side surface;
    a seventh lens with a negative refractive power, the seventh lens having a concave object side surface and a concave image side surface;

an eighth lens with a positive refractive power, the eighth lens having a convex object side surface and a convex image side surface; and an optical filter, disposed between the eighth lens and the imaging plane.

2. The wide-angle lens as claimed in claim 1, wherein the third lens and the fourth lens form a first cemented body, the sixth lens and the seventh lens form a second cemented body.

3. The wide-angle lens as claimed in claim 1, wherein the first lens, the second lens, the third lens, the fourth lens, the fifth lens, the sixth lens, the seventh lens, and the eighth lens each are glass lenses.

4. The wide-angle lens as claimed in claim 1, wherein at least two of the first lens, the second lens, the third lens, the fourth lens, the fifth lens, the sixth lens, the seventh lens, and the eighth lens are aspherical lenses.

5. The wide-angle lens as claimed in claim 1, wherein the second lens and the eighth lens are both glass aspherical lenses, the first lens, the third lens, the fourth lens, the sixth lens, and the seventh lens each are glass spherical lenses.

6. The wide-angle lens as claimed in claim 1, wherein the first lens and the second lens are both meniscus lenses.

7. The wide-angle lens as claimed in claim 1, wherein the field of view of the wide-angle lens is greater than or equal to 150°, and the total optical length of the wide-angle lens is smaller than or equal to 18 mm.

8. The wide-angle lens as claimed in claim 1, wherein the wide-angle lens satisfies the expression:

$$0 < f_6/d < 10;$$

where $f_6$ represents a focal length of the image side surface of the third lens, d represents a distance from a vertex of the image side surface of the second lens to a vertex of the image side surface of the third surface.

9. The wide-angle lens as claimed in claim 1, wherein the wide-angle lens satisfies the expression:

$$0 < (\varphi_8 + \varphi_9)/\varphi_{L5} < 2;$$

where $\varphi_8$ represents a refractive power of the object side surface of the fifth lens, $\varphi_9$ represents a refractive power of the image side surface of the fifth lens, $\varphi_{L5}$ represents a refractive power of the fifth lens.

10. The wide-angle lens as claimed in claim 1, wherein the wide-angle lens satisfies the expression:

$$0 < f_2/f_{L1} + f_4/f_{L2} < 2;$$

where $f_2$ represents a focal length of the image side surface of the first lens, $f_4$ represents a focal length of the image side surface of the second lens, $f_{L1}$ represents a focal length of the first lens, $f_{L2}$ represents a focal length of the second lens.

11. The wide-angle lens as claimed in claim 2, wherein the wide-angle lens satisfies the expression:

$$0 < (f_5/f_{L3} + f_7/f_{L4})/f_{L34} < 1;$$

where $f_5$ represents a focal length of the object side surface of the third lens, $f_7$ represents a focal length of the image side surface of the fourth lens, $f_{L3}$ represents a focal length of the third lens, $f_{L4}$ represents a focal length of the fourth lens, $f_{L34}$ represents a focal length of the first cemented body formed by the third lens and the fourth lens.

12. The wide-angle lens as claimed in claim 2, wherein the wide-angle lens satisfies the expressions:

$$D_1 > D_2 > D_{34};$$

$$D_8 > D_{67} > D_5;$$

Where $D_1$ represents the maximum diameter of the first lens, $D_2$ represents the maximum diameter of the second lens, $D_{34}$ represents the maximum diameter of the first cemented body, $D_5$ represents the maximum diameter of the fifth lens, $D_{67}$ represents the maximum diameter of the second cemented body, $D_8$ represents the maximum diameter of the eighth lens.

13. An imaging module, comprising a wide-angle lens and an imaging element coupled to the wide-angle lens, wherein the wide-angle lens is configured to form optical images, the imaging element is configured to convert the optical images into electrical signals; the wide-angle lens sequentially comprises a first lens, a second lens, a third lens, a fourth lens, a stop, a fifth lens, a sixth lens, a seventh lens, an eighth lens, and an optical filter, from an object side to an imaging plane;

wherein the first lens and the second lens each have a negative refractive power, a convex object side surface, and a concave image side surface; the fifth lens, the sixth lens, and the eighth lens each have a positive refractive power, a convex object side surface and a convex image side surface;

wherein the third lens and the fourth lens are cemented to form a first doublet, the first doublet has a convex image side surface, the sixth lens and the seventh lens are cemented to form a second doublet, the second doublet has a concave image side surface.

14. The imaging module as claimed in claim 13, wherein the third lens has a positive refractive power, the fourth lens has a negative refractive power, the seventh lens has a negative refractive power;

wherein the second lens and the eighth lens are both glass aspherical lenses.

15. The imaging module as claimed in claim 13, wherein the wide-angle lens satisfies the expression:

$$0 < f_6/d < 10;$$

where $f_6$ represents a focal length of the image side surface of the third surface, d represents a distance from a vertex of the image side surface of the second lens to a vertex of the image side surface of the third surface.

16. The imaging module as claimed in claim 13, wherein the wide-angle lens satisfies the expression:

$$0 < (\varphi_8 + \varphi_9)/\varphi_{L5} < 2;$$

where $\varphi_8$ represents a refractive power of the object side surface of the fifth lens, $\varphi_9$ represents a refractive power of the image side surface of the fifth lens, $\varphi_{L5}$ represents a refractive power of the fifth lens.

17. The imaging module as claimed in claim 13, wherein the wide-angle lens satisfies the expression:

$$0 < f_2/f_{L1} + f_4/f_{L2} < 2;$$

$$0 < (f_5/f_{L3} + f_7/f_{L4})/f_{L34} < 1;$$

where $f_2$ represents a focal length of the image side surface of the first lens, $f_4$ represents a focal length of the image side surface of the second lens, $f_{L1}$ represents a focal length of the first lens, $f_{L2}$ represents a focal length of the second lens, $f_5$ represents a focal length of the object side surface of the third lens, $f_7$ represents a focal length of the image side surface of the fourth lens, $f_{L3}$ represents a focal length of the third lens, $f_{L4}$ represents a focal length of the fourth lens, $f_{L34}$ represents a focal length of the first cemented body formed by the third lens and the fourth lens.

18. The imaging module as claimed in claim 13, wherein the field of view of the wide-angle lens is greater than or equal to 150°, the total optical length of the wide-angle lens is smaller than or equal to 18 mm.

19. A camera, comprising an imaging module, a processor, and a memory, wherein the imaging module comprises a wide-angle lens and an image sensor coupled to the wide-angle lens, the imaging module is configured to capture images, the processor is configured to process the captured images, and the memory is configured to store the captured images;

wherein the wide-angle lens sequentially comprises:
a first lens having a negative refractive power, a convex refractive surface, and a concave image side surface;
a second lens having a negative refractive power, a convex refractive surface, and a concave image side surface;
a third lens having a positive refractive power and a convex image side surface;
a fourth lens having a negative refractive power, a concave object side surface, and a convex image side surface;
a stop;
a fifth lens having a positive refractive power, a convex object side surface and a convex image side surface;
a sixth lens having a positive refractive power, a convex object side surface and a convex image side surface;
a seventh lens having a negative refractive power, a concave object side surface and a concave image side surface;
an eighth lens having a positive refractive power, a convex object side surface and a convex image side surface; and
an optical filter disposed between the eighth lens and the image sensory.

20. The camera as claimed in claim 19, wherein the wide-angle lens satisfies the expressions:

$$0 < f_2/f_{L1} + f_4/f_{L2} < 2;$$

$$0 < f_6/d < 10;$$

$$0 < (f_5/f_{L3} + f_7/f_{L4})/f_{L34} < 1;$$

$$0 < (\varphi_8 + \varphi_9)/\varphi_{L5} < 2;$$

$$D_1 > D_2 > D_{34};$$

$$D_8 > D_{67} > D_5;$$

where $f_2$ represents a focal length of the image side surface of the first lens, $f_4$ represents a focal length of the image side surface of the second lens, $f_{L1}$ represents a focal length of the first lens, $f_{L2}$ represents a focal length of the second lens, $f_6$ represents a focal length of the image side surface of the third lens, d represents a distance from a vertex of the image side surface of the second lens to a vertex of the image side surface of the third surface, $f_5$ represents a focal length of the object side surface of the third lens, $f_7$ represents a focal length of the image side surface of the fourth lens, $f_{L3}$ represents a focal length of the third lens, $f_{L4}$ represents a focal length of the fourth lens, $f_{L34}$ represents a focal length of the first cemented body formed by the third lens and the fourth lens, $\varphi_8$ represents a refractive power of the object side surface of the fifth lens, $\varphi_9$ represents a refractive power of the image side surface of the fifth lens, $\varphi_{L5}$ represents a refractive power of the fifth lens, $D_1$ represents the maximum diameter of the first lens, $D_2$ represents the maximum diameter of the second lens, $D_{34}$ represents the maximum diameter of the first cemented body, $D_5$ represents the maximum diameter of the fifth lens, $D_{67}$ represents the maximum diameter of the second cemented body, $D_8$ represents the maximum diameter of the eighth lens.

* * * * *